United States Patent [19]

Noguchi

[11] 3,723,224
[45] Mar. 27, 1973

[54] APPARATUS FOR MAKING RIBBED SYNTHETIC RESIN BOARDS

[75] Inventor: Ryuji Noguchi, Hamamatsu, Japan

[73] Assignee: Kabushiki Kaisha Seisan Nipponsha, Tokyo, Japan

[22] Filed: Oct. 14, 1970

[21] Appl. No.: 80,617

[52] U.S. Cl. ...............156/500, 156/244, 156/494, 156/501, 264/210
[51] Int. Cl. .............................................B29f 3/012
[58] Field of Search......156/244, 245, 494, 495, 496, 156/500, 501, 556, 557, 559, 591, 592, 595, 596, 459, 462, 470, 472, 473, 205, 594; 264/40, 210, 216; 18/1 FS

[56] References Cited

UNITED STATES PATENTS 3,247,039  4/1966  Schultheiss.....................156/501 X
3,150,217  9/1964  Shanok et al....................263/216 X
2,648,371  8/1953  Goodwin et al. ................156/490 X
3,317,951  5/1967  Huresu..................................18/1 FS
3,505,157  4/1970  Fields et al. .......................264/210 X Primary Examiner—Ralph S. Kendall
Assistant Examiner—Caleb Weston
Attorney—Linton & Linton

[57] ABSTRACT

A method and apparatus for producing synthetic resin boards having a pair of parallel synthetic resin film layers connected, but spaced apart by ribbing providing hollow spaces between said film layers and which boards are formed by extruding synthetic resin pass a fluted rotating roll and from there pass two opposing nozzles which apply the film layers to the ribbing from said fluted roll and including means for stretching the ribbing in directions at right angles to the direction of movement of the ribbing to give the ribbing walls the desired thickness and height.

4 Claims, 12 Drawing Figures

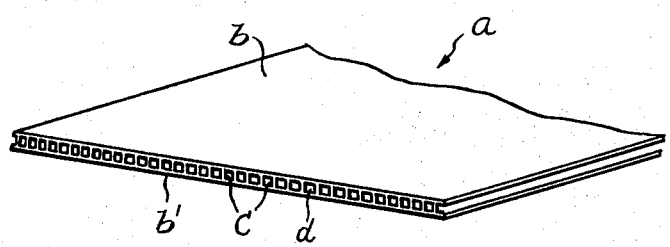
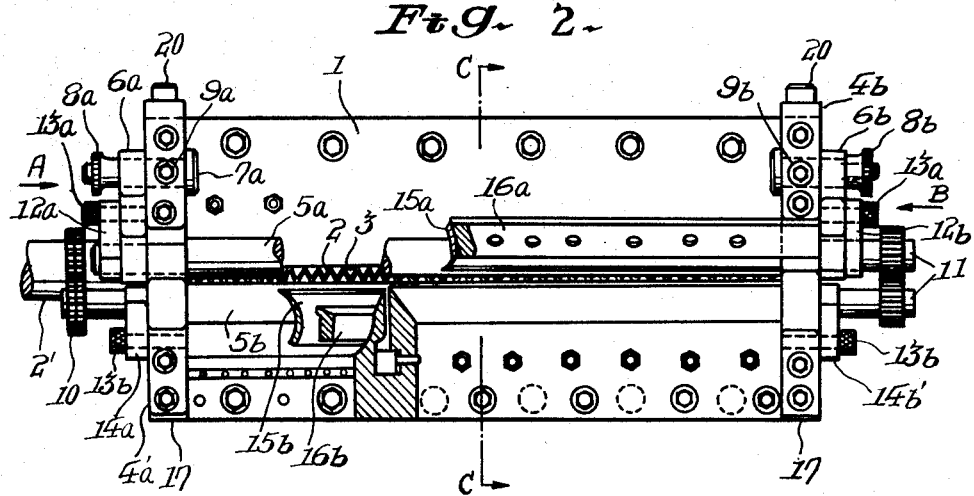

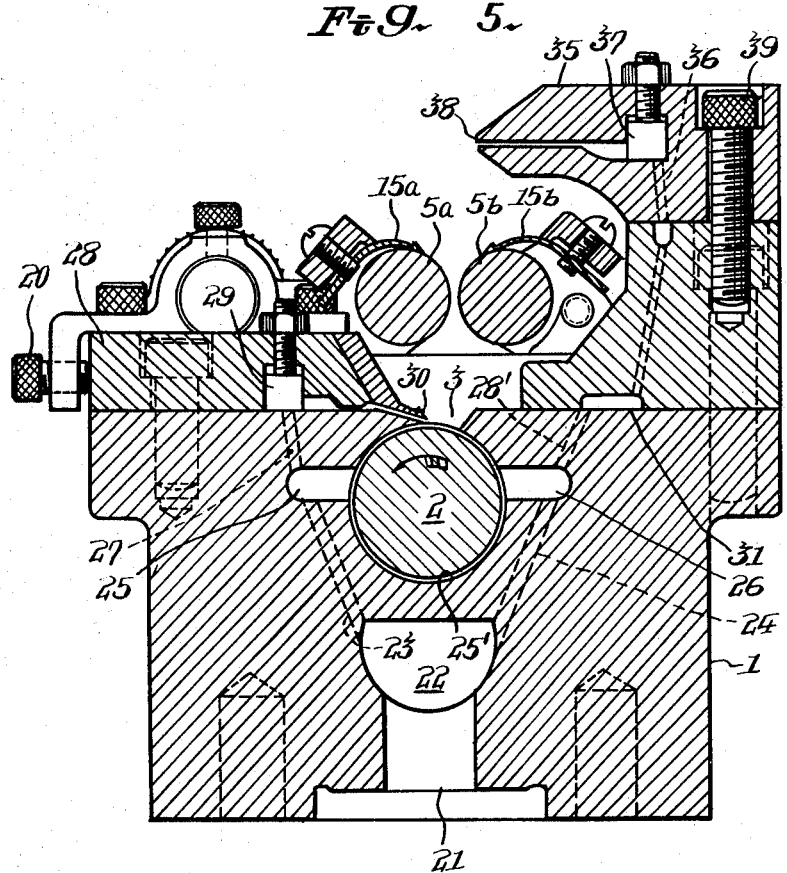

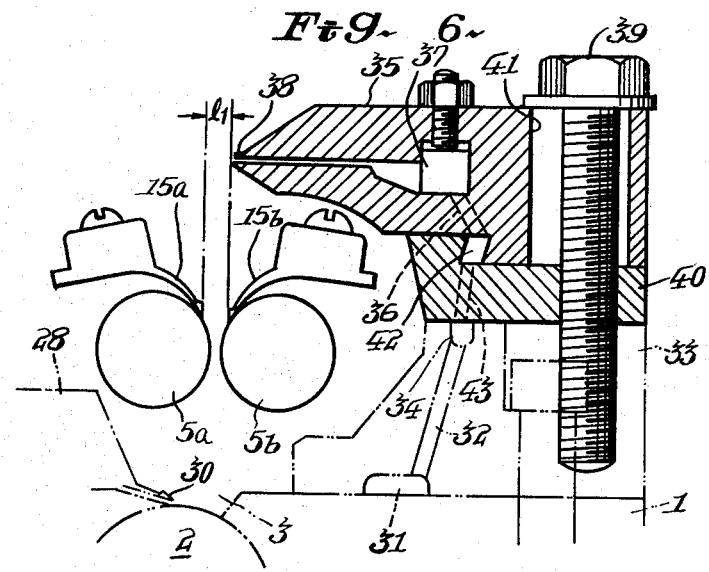
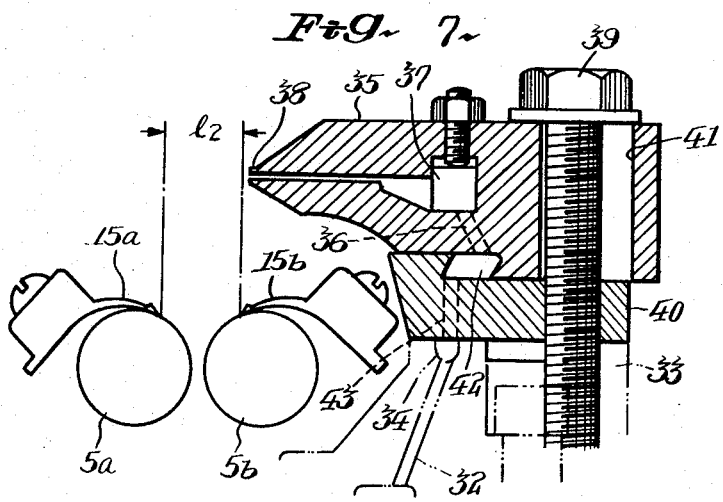

APPARATUS FOR MAKING RIBBED SYNTHETIC RESIN BOARDS

DETAILED EXPLANATION OF THE INVENTION

This invention relates to a method and apparatus for the manufacture of synthetic resin boards which consist of a pair of synethetic resin film layers parallel to each other and united together in a spaced relationship by a ribbing of honeycomb or other suitable geometry formed integrally therebetween.

The ribbed boards of synthetic resins obtained in accordance with the present invention have such great rigidity and elasticity that they have extensive possibilities as building materials, packing case materials, buffers and the like.

This invention is featured by the fact that ribs of different meshwork patterns are formed through continuous extrusion with interchangeable fluted rolls and synthetic resin film layers to constitute the surface walls on both sides or one side of the ribbing medium or is bonded to the latter by spraying of molten resin from nozzles, and that ribs and ribbed synthetic resin boards of freely chosen thicknesses can be provided by rolls for stretching the ribbing continuously formed by extrusion with the fluted roll to desired thickness and height, and doctor knives for controlling the dimensions of the ribbing being stretched.

Another feature of this invention resides in that the the stretching rolls are equipped with heating means to apply adequate heat for the stretching of the ribbing so as to avoid hardening of the ribbing due to a temperature drop of the rolls and dimensional irregularity of the stretched ribbing due to a hardening of it and thereby ensure stretching of the ribbing always to regular, fixed dimensions.

A further feature of the invention is that the doctor knives that control the stretching dimensions, are formed on the upper parts of the stretching rolls.

These and other features and objects of the present invention will become apparent from the following detailed description taken in conjunction with the accompanying drawings.

BRIEF EXPLANATION OF THE DRAWINGS

FIG. 1 is a perspective view of a form of ribbed board of synthetic resin made by the method and apparatus according to this invention;

FIGS. 2 to 12 show some embodiments of the invention. To be more specific:

FIG. 2 is a top plan view, partly cut away, of an apparatus embodying the invention;

FIG. 3 is a side elevational view as seen from the direction indicated by an arrow A in FIG. 2;

FIG. 4 is a side elevational view as seen from the direction indicated by an arrow B in FIG. 2;

FIG. 5 is a sectional view taken on line C—C of FIG. 2;

FIGS. 6 and 7 are views, partly in section, of the essential parts of another form of the second nozzle as shown in FIG. 5, as displaced by sliding motion;

FIG. 8 is a perspective view of a part of a fluted roll for ribbing use;

FIG. 9 is a perspective view of a ribbing formed by fluted roll of FIG. 8; and

FIGS. 10 to 12 are views explanatory of the way in which a ribbing is formed.

Figure 3:
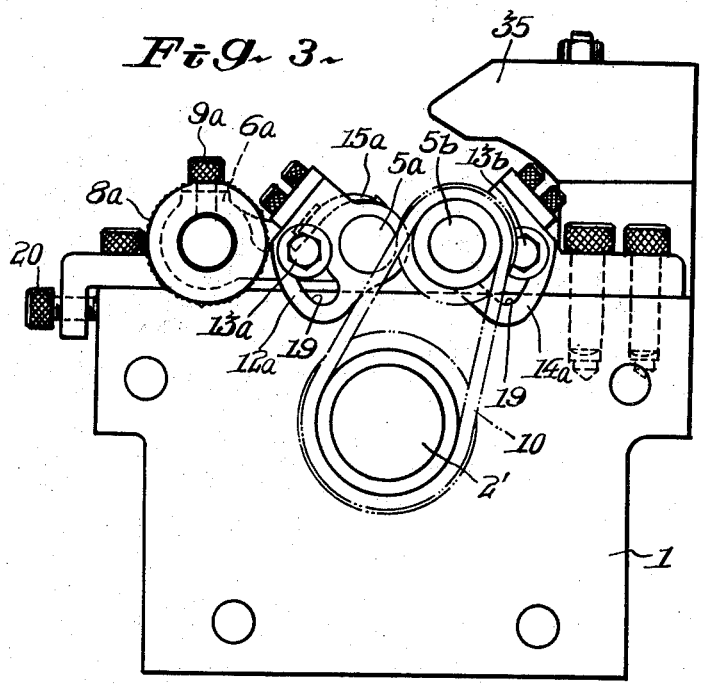
Figure 4:
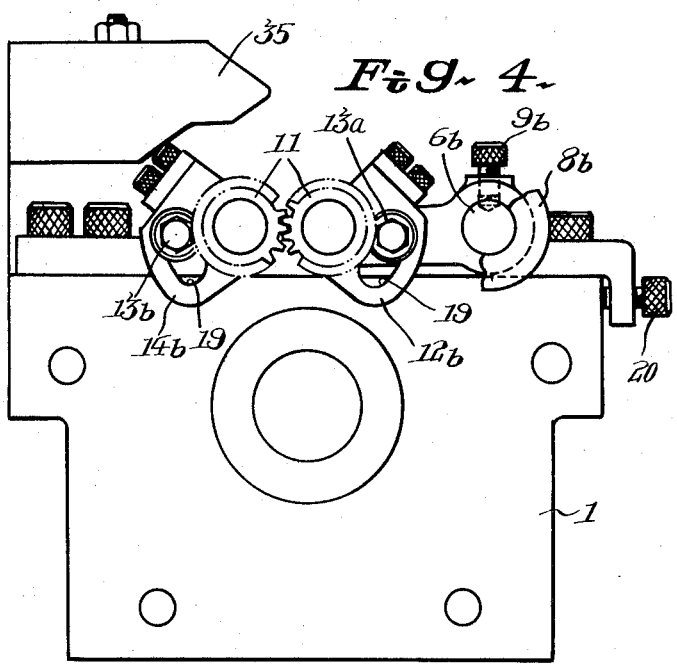

The principal construction of an apparatus according to this invention comprises a main body 1 in which a fluted roll 2 is rotatably mounted, means having a slot 3 above the fluted roll 2 in the body 1 and which has a ribbing of a meshwork or suitable pattern extruded and formed continuously by the roll 2 through the slot 3, a first nozzle means 28 having an orifice 30 for forming a resin film and disposed on one side of the slot 3 in such a manner that it bonds the resin film integrally to one side of the ribbing which is formed by extrusion through the slot 3, a pair of rib stretching rolls 5a, 5b which are symmetrically arranged above the slot 3 and parallel to the axis of the roll 2 and rotatably supported a certain distance apart in the directions opposite to each other, doctor knives 15a, 15b for controlling the degree of stretching of the ribbing which are disposed, respectively, over the rib stretching rolls 5a, 5b, and a second nozzle means 35 having an orifice 38 above the rib stretching rolls 5a, 5b and in the direction facing the space above the orifice 30, all of said means being so coordinated as to form a board in which a ribbing is integrally sandwiched between a parallel pair of resin film layers.

The individual components of the apparatus according to the present invention will be described in more detail hereafter. The main body 1 is provided with a first manifold 22 axially through the lower part thereof. The manifold 22 communicates with a resin inlet 21 therebelow and is closed at both ends with side plates 17. Above this manifold there is provided a chamber 25' to accommodate the fluted roll 2. Shafts 2' which support the both ends of the fluted roll 2 are journaled in the side plates 17 and are driven by power from an external source (not shown). On both sides of the chamber 25' that accommodates the fluted roll 2 are formed second manifolds 25, 26, which in turn are in communication with the first manifold 22 through two rows of small-diameter passages 23, 24, respectively. The chamber 25' is formed with the opening or slot 3 at the top, so that a ribbing formed by the fluted roll 2 can be extruded out through the slot 3. If the fluted roll 2 has a diagonal meshwork pattern, a honeycomb ribbing as shown will result.

To illustrate the construction of the first nozzle 28, a resin orifice 30 is formed on the top of the body 1, longitudinally along one side of the slot 3.

A choke bar 29 for regulating the amount of resin to be fed through the orifice 30 is in communication with the second manifold 25 through the row of passages 27.

The second nozzle 35 is fixed on the side staggeredly opposite to the first nozzle 28 via an intermediate member 33 in such a manner that it is directed to the space above the first nozzle 28, with the orifice 38 accordingly pointed staggeredly above the orifice 30 of the first nozzle 28.

The second nozzle 35 communicates with the second manifold 26 through passages 28' and a third manifold 31 formed in the intermediate member 33 along its boundary with the body 1, the third manifold 31 being in communication with a fourth manifold 34 formed at the top of the intermediate member 33 facing with the second nozzle 35 via passages 32 formed through the intermediate member 33, the fourth mainfold 34 being further in communication with the orifice 38 via passages 36 formed through the second nozzle 35.

At the root of the orifice 38 is provided a choke bar 37 for regulating the amount of resin to be fed out. The second nozzle 35 is fastened to the intermediate member 33 at certain points with clamping bolts 39. As shown in FIG. 6 and FIG. 7, this second nozzle 35 is made adjustable in position so that the orifice 38 may be shifted a certain distance forward or backward for a reason to be explained later.

In the modified embodiment shown, a spacer 40 is provided between the contacting faces of the intermediate member 33 and the second nozzle 35, the second nozzle 35 being mounted on the spacer 40 in such a manner as to slide to or fro thereover. In addition, a variable manifold 42 is provided between the bottom surface of the second nozzle 35 and the top surface of the spacer 40, the fourth manifold 34 and the variable manifold 42 are in communication with each other via passages 43 formed through the spacer 40, and the variable manifold 42 and the orifice 38 are in communication with each other via passages 36.

The second nozzle 35 is formed with slots 41 to receive the clamping bolts 39, which slots are elongated in the directions where the second nozzle can slide forth and back, thus rendering it possible to freely adjust the lip position of the orifice 38 of the second nozzle 35 within the confinement of the slots 41.

Next, the means for adjusting the stretch of the ribbing will be described. Above the slot 3 of the body including the orifice 30 of the first nozzle 28 and beneath the orifice 38 of the second nozzle 35, there are symmetrically supported by bearings a pair of rib stretching rolls 5a, 5b with a given distance in between and parallel to the slot 3. Of the two rib stretching rolls 5a, 5b, the latter is supported by bearings 4a', 4b' on both side plates of the body 1, with the axis kept stationary. The other rib stretching roll 5a closer to the first nozzle is supported by bearings 6a, 6b secured by pins 7a, 7b, respectively, to movable bearings 4a, 4b which are slidably adjustable in position over the body 1. Thus, the roll 5a is turnable upward about the pins 7a, 7b, and can be kept stationary with the pins 7a, 7b fixedly locked by means of locking bolts 9a, 9b.

The forward or backward sliding of the rib stretching roll 5a is accomplished as the roll is turned forward or backward about the pins 7a, 7b by adjusting bolts 20, 20 provided on sides of the movable bearings 4a, 4b, so that the distance between the rib stretching rolls 5a, 5b can be adjusted as desired.

The two rolls 5a, 5b are driven by rotational force transmitted through a sprocket attached to one end of the roll 5b and a sprocket and a chain 10 attached to the shaft end of the fluted roll 2. By means of gears 11 fitted to the other ends thereof, the rolls 5a, 5b are caused to rotate in the opposite directions, synchronously with the rotation of the fluted roll 2.

Now, let us consider the means to control the degree of stretching of the ribbing by the rib stretching rolls 5a, 5b to desired dimensions.

A pair of doctor knives 15a, 15b are disposed opposite to each other at the edges over the top peripheral portions of the rib stretching rolls 5a, 5b. The knife 15a associated with the rib stretching roll 5a is fixedly secured to doctor knife positioners 12a, 12b which are fastened to the bearings 6a, 6b with locking bolts 13a. The doctor knife positioners 12, 12b are formed with guide slots 19 which can be suitably turned along the locking bolts 13a to displace the doctor knife positioners 12a, 12b.

On the other hand, the doctor knife 15b associated with the rib stretching roll 5b is fastened to doctor knife positioners 14a, 14b, which in turn are formed with guide slots 19 which can be suitably turned along the locking bolts 13a, 13b to displace the doctor knife positioners 14a, 14b.

These doctor knives 15a, 15b are set for displacement in such a manner that, when their edges are brought close to each other as shown in FIG. 6, the distance $l1$ between the edges of the doctor knives 15a, 15b on the rib stretching rolls 5a, 5b is small and, when their edges are held apart as shown in FIG. 7, the edge distance $l2$ of the doctor knives 15a, 15b on the rib stretching rolls 5a, 5b is large. Thus it is possible to form a ribbing of a suitably chosen height $l$ by the rib stretching rolls on the basis of the dimensional setting of the distance $l1 - l2$ between the edges of the doctor knives 15a, 15b.

Figure 8:
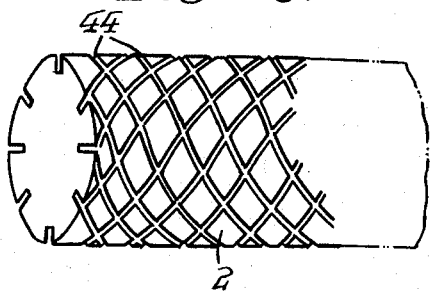
Figure 9:
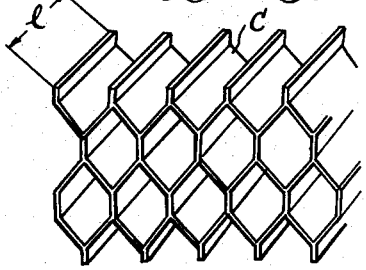
Figure 10:
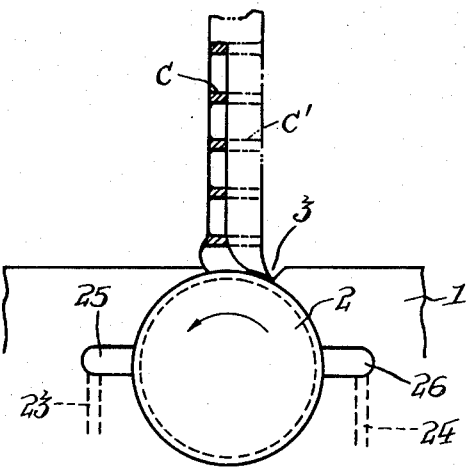
Figure 12:
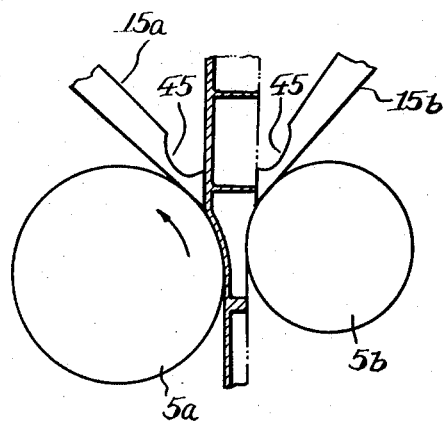

The method of manufacturing a ribbed hollow plate of synthetic resin by use of an apparatus of the construction above described is as follows. Molten resin emerging from an extruder (not shown) is forced through the resin inlet 21 at the bottom of the body 1 into the first manifold 22 and thence uniformly into the second manifolds 25, 26 via pluralities of passages 23, 24 which are provided in rows at closer pitches away from the center while the diameter of the individual passages is increased away from the center to ensure uniform flow of the resin from the first manifold 22 toward the second manifolds 25, 26. The resin that has entered the second manifolds 25, 26 is again homogenized there, and is partly introduced into the chamber 25' accommodating the fluted roll 2. By the rotation of the roll 2 the resin is forced into grooves 44 (FIG. 8) of a diagonal meshwork pattern, and the resulting ribbing c as shown in FIG. 10 is extruded out through the slot 3 of the body 1.

The ribbing c thus extruded is limited in width when the roll 2 is running at a high speed and has an increased width when the roll 2 is running at a low speed as indicated by imaginary lines.

One side of the extruded ribbing is scraped up by the under lip E of the orifice 30 of the first nozzle 28 and is urged upward. Meanwhile, the resin portions from the second manifolds 25, 26 are fed through the passages 27, 28, respectively, to the first nozzle 28 of the second nozzle 35, so that they can be blown out of the orifices 30, 38.

The resin portion from the first nozzle 28 is blown against one side of the ribbing c that is extruded through the slot 3 of the body 1, thereby forming a film b' as an outer wall integral with the ribbing c. The ribbing c united with the film b' on one side is urged upward until it passes through the pair of stretching rolls 5a, 5b, so that it may be stretched to a desired height.

Figure 11:
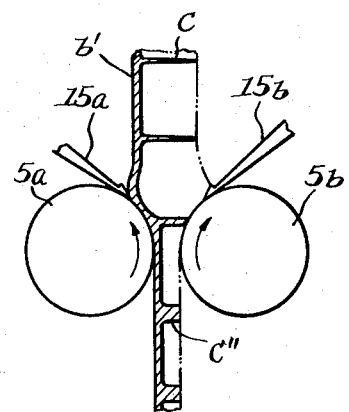

Referring now to FIG. 11, the ribbing that emerges from the slot 3 and formed with the resin film b' on one side is introduced, in a state of a low, thick-walled ribbing c'', between the stretching rolls 5a, 5b. Since the stretching rolls 5a, 5b are running in opposite directions as indicated by arrows, the thick-walled ribbing c'' is expanded in the lateral directions as viewed in the figure to an increased height immediately before it leaves the nip between the stretching rolls, and is pulled out of the rolls in the form of a thin-walled ribbing c.

The height that the ribbing c thus assumes is, as mentioned above, dictated by the preset value of the distance $l1 - l2$ between the edges of the doctor knives 15a, 15b and also by the adjusted nip of the stretching rolls 5a, 5b.

The ribbing stretched and pulled out of the rolls 5a, 5b is scraped off and stretched by the edges of the doctor knives 15a, 15b and the resin relief grooves 45 formed on the upper surfaces of the knife edges permit the ribbing to proceed smoothly upward without the possibility of the resin sticking to the upper surfaces of the knife edges.

When the ribbing c integrally formed with a film b' on one side and stretched to given dimensions has ascended to a point facing the orifice 38 of the second nozzle 35, another spray of resin from the orifice 38 forms a film b on the other side of the ribbing to form a unitary structure. In this way a synthetic resin board a having a hollow space d defined by a ribbing medium of a mesh-work pattern as shown in FIG. 1 is continuously obtained.

As stated above, the forming of the film b' presents no technical problem because the resin is blown through the orifice 30 against the ribbing immediately upon the extrusion of the ribbing through the slot 3 of the body 1. By contrast, it is necessary with the second nozzle 35 that carries out the application of the resin on the other side of the ribbing emerging from the stretching rolls 5a, 5b, to adjust the working position of the orifice 38 in view of the height of the ribbing c already attained under control. In such a case, as shown in FIG. 6 and FIG. 7, it is possible to loosen the clamping bolts 39 on the second nozzle 35 and slide the nozzle suitably forward or backward until the position of the orifice 38 adequately corresponds to the distance $l1 - l2$ between the edges of the doctor knives 15a, 15b. The resin is fed to the second nozzle 35 smoothly at a rate required, thanks to the variable manifold 42 provided intermediate the associated passages.

In accordance with this invention, as described hereinabove, resin is applied by the first nozzle on one side of a ribbing being continuously extruded from the roll 2 thereby forming a film b immediately on that side of the ribbing to form a unitary structure therewith. The ribbing provided with a film on one side in this way is stretched by stretching rolls in the direction at right angles to the direction where the ribbing proceeds, with the aid of freely adjustable doctor knives for stretching the ribbing to desired dimensions and to suitably reduced thickness. Thus a ribbed synthetic resin board of a freely chosen thickness can be continuously formed to an advantage.

While the embodiments of the present invention described hereinbefore generally involve the use of a fluted roll of an oblique meshwork pattern and, hence, the manufacture of a synthetic resin board having a ribbing of honey-comb or similar meshwork pattern, it should of course be noted that synthetic resin boards having linear or corrugated ribs can be formed without any modification of the components excepting the use of a fluted roll having a linear or curvy pattern.

Further, if necessary, the choke bars of the first and second nozzles may be completely closed to obtain meshed boards of desired thickness as well as those of ordinary meshwork as if formed of fine yarns. And the choke bar or either of the first nozzle or second one may be closed to obtain a strong film integral with the meshwork or desired resin stripes of straight and curved lines.

I claim:

1. An apparatus for manufacturing synthetic resin boards comprising a body having a chamber and slot above said chamber, a fluted roll rotatably mounted in said chamber and capable or continuously extruding resin in the form of a ribbing through said slot, means having a first nozzle positioned on one side of the slot and capable of extruding a resin film layer forming a layer wall adhering on one side of the ribbing being extruded from said slot, adjustable oppositely driven rotary stretching rolls positioned above said nozzle for receiving said ribbing and transferring said ribbing upward and capable of stretching the length of said ribbing to the desired extent upon adjustment between the axis of said rolls, adjustably mounted doctor knives touching the upper surface of said rolls for finally adjusting the ribbing stretched by said rolls to the desired length and tear off said ribbing from said rolls, a second nozzle positioned immediately above said rolls and opposite to said first nozzle, capable of extruding a resin film layer on the other side of said ribbing transferred by said rolls forming a layer wall adhering to the other side of said stretched ribbing.

2. An apparatus for manufacturing synthetic resin boards as claimed in claim 1 wherein the axis of said rotary rolls, which transfer said ribbing, are movable in opposed directions to each other whereby the dimensions of said ribbing are stretched and adjusted to obtain the desired wall thickness and the height thereof.

3. An apparatus for manufacturing synthetic resin boards according to claim 1 including doctor knives having edges which are disposed above said rotary rolls opposite to each other in a spaced relationship and which knives are adjustably mounted to provide a space therebetween, said knives having grooves on the upper surface to prevent the sticking of said ribbing to said edges of said doctor knives as the ribbing is scratched off from the surface of said rotary rolls.

4. An apparatus for manufacturing synthetic resin boards according to claim 1 including heating means provided for said rotary rolls whereby said rolls can be heated to a temperature necessary for the stretching of said ribbing.

* * * * *